H. S. FLEAGLE.
HOG TRAP.
APPLICATION FILED JUNE 12, 1911.
1,078,911.
Patented Nov. 18, 1913.
2 SHEETS—SHEET 1.
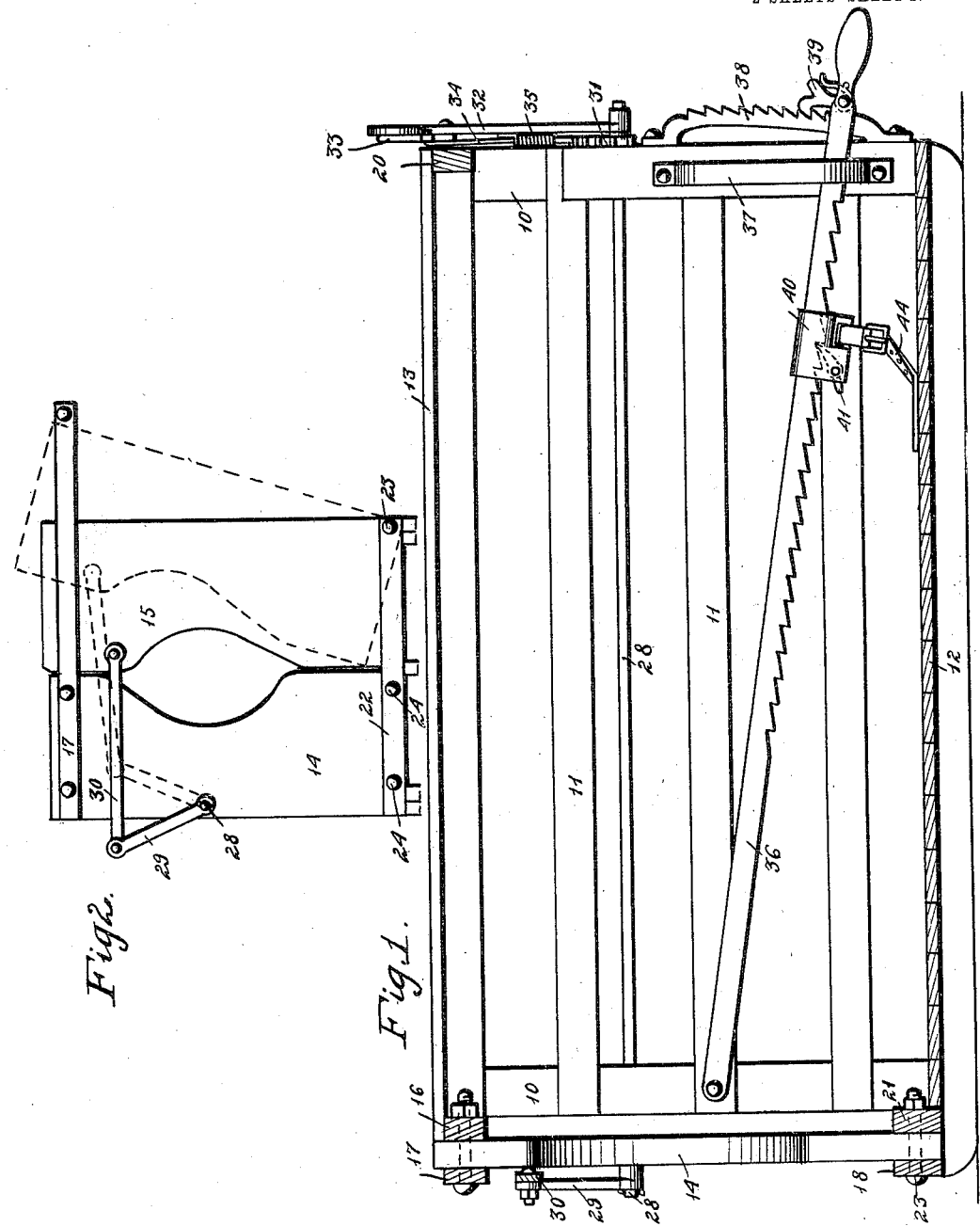
Witnesses.
W. A. Loftus,
A. G. Hague.
Inventor.
Harry S. Fleagle.
by J. Ralph Orwig Atty.

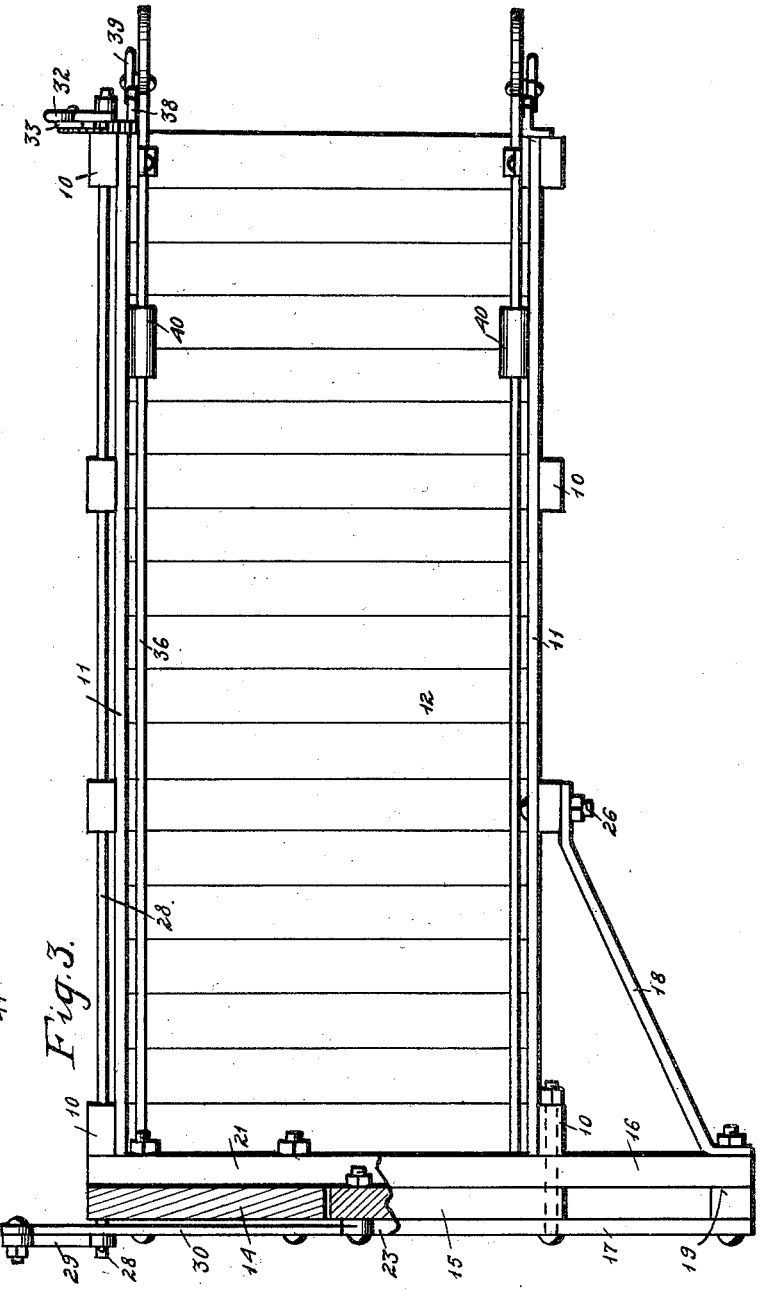

UNITED STATES PATENT OFFICE.

HARRY S. FLEAGLE, OF FARRAR, IOWA.

HOG-TRAP.

1,078,911. Specification of Letters Patent. Patented Nov. 18, 1913.

Application filed June 12, 1911. Serial No. 632,767.

*To all whom it may concern:*

Be it known that I, HARRY S. FLEAGLE, a citizen of the United States, residing at Farrar, county of Polk, State of Iowa, have invented a certain new and useful Hog-Trap, of which the following is a specification.

The object of my invention is to provide a trap for holding hogs or other animals securely and in a suitable position for putting rings in their noses or for castrating them.

It is a further object of my invention to provide such a trap which can be used by one person and by the aid of which one person can perform the operations mentioned, or others, without the aid of an assistant.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a central, vertical, sectional view through a hog trap embodying my invention. Fig. 2 shows an end view of the same taken from the front. Fig. 3 shows a top or plan view of the said trap. Fig. 4 shows a detail view of part of the device, and Fig. 5 shows another detail view of the same part.

Referring to the accompanying drawings, I have used the reference numeral 10 to indicate the uprights forming the corners of the trap which is made in the shape of a rectangular box. The top 13, the bottom 12 and the sides may be made solid or of slats or bars 11, spaced apart from each other and secured to the uprights 10, and to cross pieces 20, 16 and 21, as shown in Figs. 1 and 3.

The front end of the trap is composed of two upright members 14 and 15 substantially equal in width. The combined width of the members 14 and 15 is approximately equal to the width of the trap. The members 14 and 15 are constructed with openings on their inner edges which register with each other and are designed to receive and hold the neck of an animal in the trap. The member 14 is firmly secured to the cross pieces 16 and 21 which extend across the trap at the upper and lower parts respectively of the front end thereof. The member 15 is pivotally secured to the frame of the trap by means of the bolt 23 at the lower outside corner of said member 15. A reinforcing strip 22 extends along the lower part of the front of the trap on the outside and is secured to the member 14 and the cross piece 21 by means of bolts 24. A similar reinforcing strip 17 extends across the upper portion of the front end of the trap. The cross member 16 and the reinforcing strip 17 extend laterally from the trap to form a brace for the member 15 when the latter is in its open position as hereinafter explained. A brace 18 extends from the outer end of the cross member 16 rearwardly and toward the frame of the trap to which it is secured by a bolt 26. The member 15 moves freely on the bolt 23 between the cross member 16 and the reinforcing strip 17 and between the cross member 21 and the reinforcing strip 22 and is designed to swing laterally from the trap to enlarge the opening for the head of an animal as clearly shown by the dotted lines in Fig. 2. The outer ends of the upper cross piece 17 and the cross pieces 16 are braced as heretofore described.

Near the outer edge of the member 14 is rotatably mounted a rock bar 28 which is rotatably mounted in the frame of the trap and extends to the rear end thereof. Secured to the rock bar 28 is an upwardly extending arm 29 to which is pivoted a link 30. The link 30 is pivotally secured to the member 15. The arrangement of the rock bar 28, the arm 29, the link 30 and the member 15 is such that the rotation of the rock bar 28 moves the member 15 laterally from the trap to the position shown by the dotted lines in Fig. 2. At the rear end of the trap adjacent to the rock bar 28 is a sector 31. Secured to the end of the rock bar 28 is a lever arm 32. Pivoted to the upper end of the lever arm is an ordinary bell crank lever 33 which is pivoted to the rod 34, the head of which is designed to engage notches on the sector 31. The spring 35 normally holds the rod 34 in engagement with the sector 31.

The lever and means for securing the same in various positions of its movement just described, are of ordinary construction. On each side thereof, arms 36 are pivoted to the frame near the front end at points spaced apart from the bottom of the trap. These arms normally extend rearwardly and downwardly, as shown in Fig. 1. At the rear end of the trap, the arms 36 are received in loops 37 which are secured to the frame and limit the upward and downward movement of the rear end of the arms 36. Secured to the frame adjacent to the rear ends of the arms 36, are toothed bars 38. Pivotally secured to the arms 36 adjacent to the bars 38, are pawls 39 which are spring actuated to hold said pawls in normal engagement with said toothed bars. The lower edges of the arms 36 are constructed with notches, as shown in Fig. 1. Upon each of the arms 36 is slidingly mounted a sleeve 40 which is substantially U shaped in cross section, as shown in Figs. 5 and 4. A pawl 41 is pivoted in the sleeve 40, and is held in yielding engagement with the notches of the arms 36 by means of a spring 42. The sleeve 40 is constructed with a slot 43 in which is received a strap 44, on which is a suitable buckle.

It will be observed that many changes may be made in the details of construction of my device without affecting its essential purpose or functions. It is usually advisable to have a top on the trap although it may be used without one. I prefer a suitable door at the rear end, but no door is shown in the drawing.

In practical operation, the animal is driven into the trap from the rear end and the rear end is closed by a suitable door or other means. By means of the lever 32 and its accompanying mechanism, the front member 15 may be moved laterally to the position shown by the dotted lines in Fig. 2, and the animal can be urged forward until his neck is received between the members 14 and 15. The member 15 is then drawn to its closed position and secured in said position by the mechanism heretofore described. The animal will thus be tightly held. Straps 44 may be secured around the hind legs which may then be held in any desired position.

The sleeve 40 may be moved toward the front of the trap whenever desired, and may be locked in position by means of the spring actuated pawl. In this way the trap is adapted for the sizes of various animals. If desired the hind quarters of the animal may be lifted wholly from the ground by raising the arms 36 and securing them in their raised positions by means of the pawls 39 and the toothed bars 38. When it is desired to release the animal, the straps 44 can be unbuckled and the sleeve 40 moved rearwardly by releasing the pawl 41.

The advantages of my improved trap are obvious. When it is used, the animal can be driven in and firmly held in any desired position. The trap is adjustable for use with animals of different sizes, and may be used for a variety of purposes. One special advantage is that one person can use it in performing various operations which would otherwise require an assistant.

I claim as my invention:

1. In a device of the class described, a frame comprising side members, front members, one of said front members being capable of movement for securing the neck of an animal between said front members, levers pivoted on each side of the machine near the front end of said device at points above the bottom of said device, means for adjustably securing the rear ends of either of said levers in various positions of their upward and downward movement for raising or lowering one leg or side of the animal independent of the other leg or side.

2. In a device of the class described, a frame comprising side members, front members, one of said front members being capable of movement for securing the neck of an animal between said front members, levers pivoted on each side of the machine near the front end of said device at points above the bottom of said device, means for adjustably securing the rear ends of either of said levers in various positions of their upward and downward movement for raising or lowering one leg or side of the animal independent of the other leg or side, means slidably mounted on each of said levers capable of being locked to prevent rearward movement thereof and means for securing the leg of an animal to each of said last named means.

3. In a device of the class described, a frame comprising side members, front members, one of said front members being capable of movement for securing the neck of an animal between said front members, levers pivoted on each side of the machine near the front end of said device at points above the bottom of said device, means for adjustably securing the rear ends of either of said levers in various positions of their upward and downward movement for raising or lowering one leg or side of the animal independently of the other leg or side, said levers being capable of control from the rear of the machine.

Des Moines, Iowa, May 26, 1911.

HARRY S. FLEAGLE.

Witnesses:
M. T. GILMORE,
W. P. BAIR.

Copies of this patent may be obtained for five cents each, by addressing the "Commissioner of Patents, Washington, D. C."